United States Patent
Gordon et al.

(10) Patent No.: US 10,988,115 B2
(45) Date of Patent: Apr. 27, 2021

(54) SYSTEMS AND METHODS FOR PROVIDING VEHICLE ACCESS USING BIOMETRIC DATA

(71) Applicant: Ford Global Technologies, LLC, Dearborn, MI (US)

(72) Inventors: Alan Gordon, Menlo Park, CA (US); Connie Zeng, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 16/272,633

(22) Filed: Feb. 11, 2019

(65) Prior Publication Data
US 2020/0254974 A1    Aug. 13, 2020

(51) Int. Cl.
| | |
|---|---|
| *B60R 25/25* | (2013.01) |
| *G06Q 10/02* | (2012.01) |
| *G06Q 50/30* | (2012.01) |
| *G07C 9/00* | (2020.01) |
| *B60R 25/24* | (2013.01) |
| *G07C 9/25* | (2020.01) |
| *G07C 9/26* | (2020.01) |

(52) U.S. Cl.
CPC ............ *B60R 25/25* (2013.01); *B60R 25/241* (2013.01); *G06Q 10/02* (2013.01); *G06Q 50/30* (2013.01); *G07C 9/00309* (2013.01); *G07C 9/00563* (2013.01); *G07C 9/257* (2020.01); *G07C 9/26* (2020.01); *G07C 2009/00396* (2013.01); *G07C 2009/00468* (2013.01)

(58) Field of Classification Search
None
See application file for complete search history.

(56) References Cited

U.S. PATENT DOCUMENTS

| | | | | |
|---|---|---|---|---|
| 5,582,449 | A * | 12/1996 | Weyerstall | E05B 85/02 |
| | | | | 292/216 |
| 10,403,392 | B1* | 9/2019 | Chandrasekaran | G16H 10/60 |
| 2017/0069148 | A1* | 3/2017 | Gilbertson | G07C 9/00857 |
| 2017/0349184 | A1 | 12/2017 | Tzirkel-Hancock et al. | |
| 2018/0181772 | A1* | 6/2018 | Shchur | G06K 9/00362 |

(Continued)

FOREIGN PATENT DOCUMENTS

JP    6372836 B2    8/2018

OTHER PUBLICATIONS

Simic, B., "Navigating a Fully Biometric Driver Experience," Forbes Technology Council, Apr. 11, 2017 (3 pages). Retrieved from https://www.forbes.com/sites/forbestechcouncil/2017/04/11/navigating-a-fully-biometric-driver-experience/#1cac785f455c.

*Primary Examiner* — Carlos Garcia
(74) *Attorney, Agent, or Firm* — Brandon Hicks; Eversheds Sutherland (US) LLP

(57) ABSTRACT

Systems and methods providing vehicle access using identified biometric data are provided herein. An example method includes storing a first biometric input for a user in a database; receiving a ride reservation from the user, the ride reservation having at least a pickup location; activating a biometric input device associated with a vehicle when the vehicle arrives at the pickup location to obtain a second biometric input for the user; authenticating the user by comparing the first biometric input with the second biometric input; and granting access to the vehicle when the first biometric input substantially matches the second biometric input.

17 Claims, 5 Drawing Sheets

(56) References Cited

U.S. PATENT DOCUMENTS

| | | |
|---|---|---|
| 2018/0231979 A1 | 8/2018 | Miller et al. |
| 2019/0064806 A1* | 2/2019 | Nix ........................ B60W 50/00 |
| 2020/0193368 A1* | 6/2020 | Bhatia ..................... B60R 25/10 |

* cited by examiner

SYSTEMS AND METHODS FOR PROVIDING VEHICLE ACCESS USING BIOMETRIC DATA

TECHNICAL FIELD

The present disclosure relates to systems and methods that allow for biometric-based access to vehicles, and in some instances, to autonomous vehicles. In some embodiments, the systems and methods use secure, de-identified biometric data.

BACKGROUND

Within the paradigm of ride sharing, it is often difficult for vehicle drivers to determine the identity of riders. These problems are exacerbated when many people are waiting for ride sharing vehicles. These issues also abound in autonomous vehicle transportation scenarios. Additionally, ride share users may be required to possess specific types of identification to enter ride sharing vehicles, which complicates the ride sharing process and may reduce participation.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In some embodiments, systems and methods disclosed herein provide vehicle access to users based on biometric data, and in some instances secure biometric data. In a ride sharing use case that utilizes an autonomous vehicle (AV), mechanism(s) are provided to validate or authenticate a rider prior to allowing the rider to access the vehicle. A convenient and secure mechanism can include the use of biometrics such as facial recognition. However, because the vehicle that may pick up a particular rider may not be known until the user books his/her ride, it is envisioned that biometric data can be securely stored in a cloud. A mobile application and associated protocols can be provided to the user that allows biometric data to be used without exposing the data for potential compromise by a malicious actor.

In one embodiment, a customer of a ride sharing service can input one or more of his/her biometrics such as a fingerprint, a selfie, an iris image and/or a short recording of the user's voice, into a mobile or web application when the user sets up an account with the ride sharing service. The vehicle (which could include an AV) has a connection to the Internet and also comprises one or more biometric sensors. Riders can authenticate themselves to the vehicle using their biometric values in real-time, as they approach the vehicle. These will be compared to those previously stored when they set up their accounts in order to authenticate the rider.

In some embodiments, a rider's identity can be authenticated based on a confidence score that is indicative of the biometric value comparison. Should the confidence score be sufficient, access to the ride sharing vehicle will be granted. In the event that the confidence score is not sufficient, the rider may be asked to enter an access code (provided previously when the ride was booked) into an interface of the ride sharing vehicle. Should a code entered by the rider match that provided earlier, access to the ride sharing vehicle can be granted. If the code does not match, access to the ride sharing vehicle may not be granted. This solution not only provides a keyless solution to ride sharing vehicle access, but also a solution in which the only key that is required is the rider's biometrics, because the rider is essentially an access key.

Some embodiments can implement additional features related to security, such as de-identification of biometric data that is stored in the cloud. This de-identified biometric data can be used to authenticate a rider at a pickup location by the AV. These and other aspects and advantages of the present disclosure are described in greater detail herein with reference to the collective drawings.

Illustrative Architecture

Figure 1:
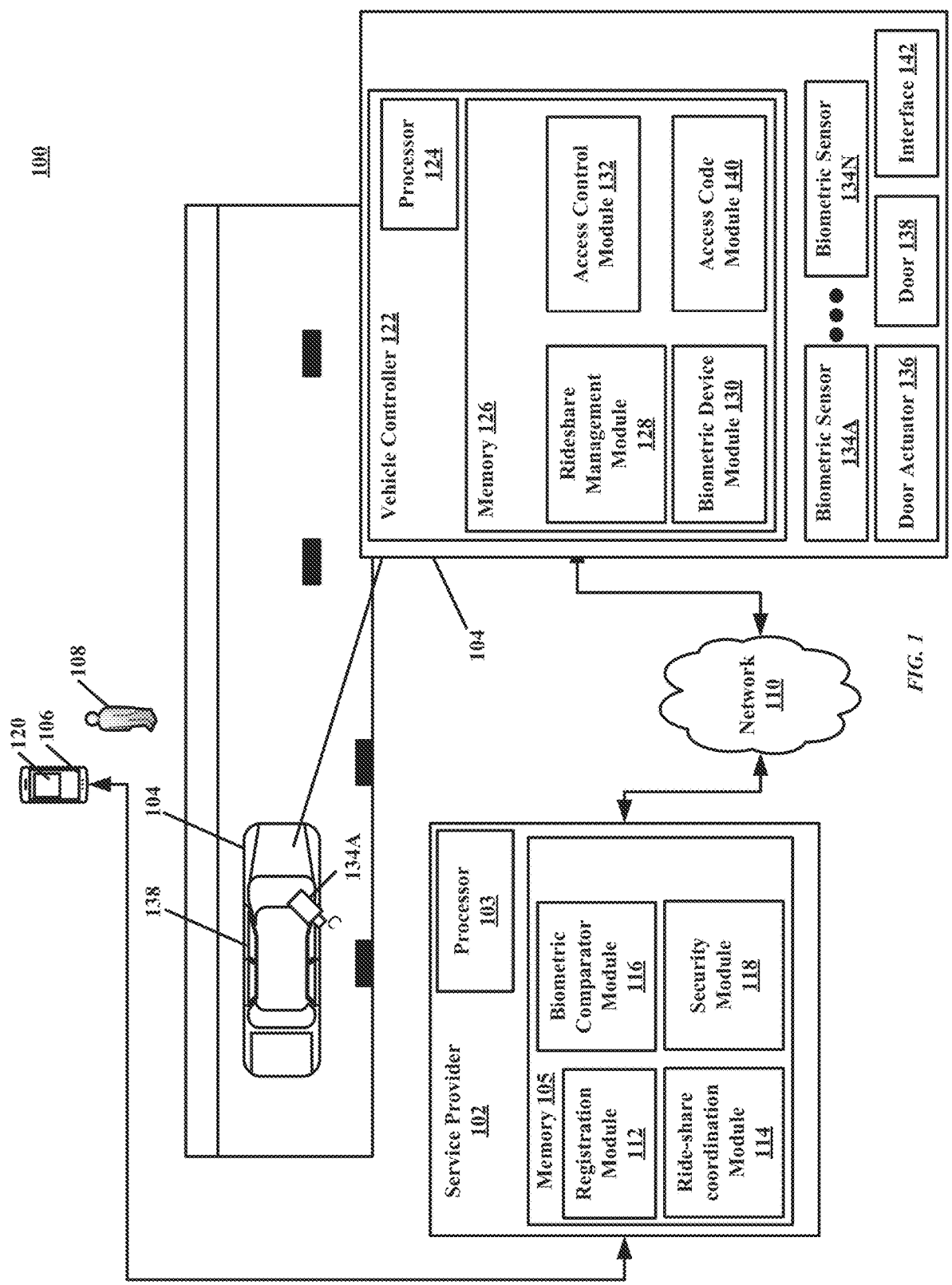
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a service provider 102, a vehicle 104, a mobile device 106 associated with a user 108 (e.g., rider), and a network 110. The network 110 may include any one or a combination of multiple different types of networks, such as cable networks, the Internet, wireless networks, and other private and/or public networks. In some instances, the network 110 may include cellular, Wi-Fi, or Wi-Fi direct.

In some embodiments, the features and functions of the present disclosure related to biometric-based vehicle access can be performed entirely by the service provider 102. In other embodiments, the biometric-based vehicle access features can be performed at the vehicle level, and in other embodiments the biometric-based vehicle access features can be executed cooperatively between the service provider 102 and the vehicle 104 as will be described in greater detail herein.

Broadly described, the service provider 102 is configured to obtain and maintain user accounts that include user data. The user data can include stored biometric data or secure representations of biometric data. Each user record can be associated with a unique identifier that allows the service provider 102 to identify relevant user accounts when ride requests (e.g., ride reservations) are received. The service provider 102 may also provide ride share coordination services between the user 108 and the vehicle 104. In various embodiments, the user 108 can request a ride through the service provider 102. The service provider 102 can dispatch or otherwise communicate the ride request to the vehicle 104, and in some embodiments, perform biometric authentication of the user 108 so that the user 108 can access the vehicle 104. While some embodiments disclose implementations that involve autonomous vehicles, the present disclosure is not so limited and can be applied in non-autonomous vehicle scenarios. Also, the service provider 102 can be configured to provide biometric-based authentication of users for vehicle access in non-ride-sharing processes.

Generally, the service provider 102 can comprise at least one processor 103 and a memory 105. The service provider 102 is a specifically configured computer that is configured to provide the features disclosed herein. In more detail, the processor 103 executes instructions stored in the memory 105 to provide any one or more of the features disclosed herein. In one embodiment, the memory 105 stores a plurality of modules. In more detail, the service provider 102 comprises a registration module 112, a ride-share coordination module 114, a biometric comparator module 116, and an optional security module 118. Each of these modules can alternatively be configured as a networked group of servers.

In one embodiment, an application 120 is provided for execution on the mobile device 106 of the user 108. The mobile device 106 can include any end user computing device such as a smartphone, a tablet, and/or a smartwatch (or other wearable computing device)—just to name a few. In some embodiments, the user 108 can execute the application 120 and create an account that is managed by the service provider 102. The user 108 can provide demographic data, as well as provide one or more types of biometric data that can be stored at the service provider 102 level.

Registration of a user may include registration of persons who may utilize ride-sharing services, but may not necessarily be the person who is performing the registration. For example, a parent may register their child(ren) as a user(s), a guardian may register a person with a physical or mental disability, or a child may register his/her aging parent(s), and so forth.

The user 108 can provide any one or more types of biometric data. In some embodiments, the user 108 can provide biometric data such as an iris scan, a fingerprint, a facial photograph (e.g., selfie), and/or a natural language or spoken word recording—just to name a few. In embodiments using photographs, the user 108 can be prompted through the application 120 to obtain photographs at various angles.

The user 108 can provide the service provider 102 with one or more of these biometric data through the user's mobile device 106. The account of the user 108 can be associated with unique identifying information (e.g., unique identifier) such as an email address and/or password, a unique value, or other similar data that can be used to identify messages from the user 108, such as ride requests. The unique identifier can be used to obtain and store biometric input or representations of biometric input as well.

In one example embodiment, the user 108 can capture a selfie with his/her mobile device 106. The mobile device 106, mediated through the application 120, can provide the registration module 112 with the selfie. The registration module 112 can store the selfie of the user 108 in the user's account or in another location that is linked to the user's account. In another example embodiment, the user 108 can speak a phrase into his/her mobile device 106. The mobile device 106 can forward this audio data to the registration module 112 for processing and/or storage as one type of biometric input. Biometric data that is input by the user 108 prior to a subsequent authentication process (such as during a ride share request) is referred to as a first biometric input.

To be sure, many types of first biometric input can be received and stored, allowing for flexibility and redundancy when authenticating the user 108 in a subsequent authentication process.

Once the user 108 has established a user account and provided at least one type of biometric data for the account, the user 108 can request a ride using the application 120. In general, the ride request can include an immediate request for a ride or a scheduled request for a ride at a future point in time and location. When the ride request is for an immediate ride, the application 120 leverages location data provided by the mobile device 106 to identify a current location of the user 108. Other parameters of the ride request can include a drop-off location, a number of riders, and so forth. The application 120 then transmits the ride request to the service provider 102. In various embodiments, the application 120 includes the unique identifier in the request that identifies the user 108. For example, the ride request could include the email address associated with the account of the user 108. In embodiments where multiple riders or users are to be picked up at a location, the ride share request can include user identifiers for each of these individuals.

When the service provider 102 receives the ride share request, the ride-share coordination module 114 is executed to match parameters of the ride request to available vehicles, such as the vehicle 104. In general, the vehicle 104 comprises a vehicle controller 122 that comprises a processor 124 and a memory 126. The processor 124 is a specifically configured computing device that is capable of performing various aspects of the present disclosure.

In some embodiments, the memory 126 stores executable modules such as a rideshare management module 128, a biometric device module 130, an access control module 132 and an access code module 140. The vehicle 104 also includes one or more biometric sensors 134A-134N (also referred to as biometric input devices) that can include any biometric sensor that would be known to one of ordinary skill in the art, such as a fingerprint scanner, an iris scanner, a camera, and/or a microphone—just to name a few. In one example, the biometric sensor 134A includes a camera. Also, the vehicle 104 can include one or more actuators, such as a door actuator 136. In one embodiment, the door actuator 136 includes a servo that can cause a door 138 of the vehicle 104 to open and/or close when a user is authenticated in accordance with the present disclosure.

In one or more embodiments, the rideshare management module 128 receives a rideshare itinerary from the service provider 102. The rideshare itinerary can include ride parameters such as a pickup location, a pickup time, and identifying information of the user 108 requesting the ride. As noted above, the rideshare itinerary can comprise a plurality of pickup requests for a plurality of users.

Ride-related data for any particular car may take many forms. For example, the ride data may comprise a list of lists. A higher level list contains the list of stops that the vehicle will make during some span of time. Each element of the list is itself a list of one or more passengers that must be picked up (and authenticated) at each stop. In other embodiments, the list may include information pertaining to the day, time, unique identifier (used to locate a user account and stored biometric input) and location, for example. Based on the vehicle routing software, the vehicle may know where it is needed to be and at what time it needs to be there. It may, however, not know the unique identifier for the user until it requests that information from the service provider 102, at the day/time that the user is scheduled to utilize the service. The ride data may comprise GPS location data. In some embodiments a vehicle list may include stop/pickup location data. Should more than one registered user request to be picked up at a stop location, the order in which the users authenticate themselves may be random. The service provider 102 or vehicle controller 122 (depending on the embodiment) can compare each of the users registered to ride in the vehicle from that location against the real-time biometric data, and allow registered users to access the vehicle 104 if authorized. Example authentication processes are disclosed in greater detail herein.

Once the vehicle 104 nears the pickup location specified in the rideshare request (which could occur autonomously through a navigation capability of the vehicle controller 122), the vehicle 104 can activate at least one of the one or more biometric sensors 134A-134N. In various embodiments, the biometric device module 130 selects an appropriate one of the one or more biometric sensors 134A-134N based on the type of biometric data that was stored as the first biometric input. That is, if the first biometric input was a photograph, the biometric device module 130 can activate a camera (one of the biometric sensors 134A-134N) when the user 108 approaches the vehicle 104 to obtain a second photograph of the user 108.

The biometric device module 130 activates the camera 134A to obtain one or more images of the user 108. In one embodiment, the biometric device module 130 forwards these images back to the service provider 102. This process is generally referred to as receiving or obtaining a second biometric input for the user 108. In other embodiments, the images are processed directly by the biometric comparator module 116 rather than transmitting the images to the service provider 102. In sum, the vehicle controller 122 receives previously stored baseline biometric data, such as images, when dispatched by the service provider 102 to pick up a rider. At pick up, current images are obtained by the biometric device module 130 through the camera 134A and the biometric comparator module 116 analyzes the current images in view of the baseline biometric data in order to determine if a match exists.

The biometric comparator module 116 of the service provider 102 is executed to perform a comparison between the first biometric input stored in the user's account and the second biometric input obtained by the vehicle 104 in real-time. In some embodiments, the biometric comparator module 116 employs one or more facial recognition algorithms to compare the first biometric input and the second biometric input and assign a percentage confidence score that indicates if the first biometric input and the second biometric input substantially match one another. In some embodiments, the biometric comparator module 116 employs a confidence threshold value. If the percentage confidence score is at or above the confidence threshold value, the biometric comparator module 116 considers the inputs to match. Otherwise, the biometric comparator module 116 considers the inputs not to match.

If the inputs match, the biometric comparator module 116 can transmit a message to the access control module 132 of the vehicle controller 122 to activate the door actuator 136 and open the door 138 of the vehicle 104. In these embodiments, the user is considered authenticated. To be sure, this occurs in a keyless process, meaning that the user does not need to possess anything other than his/her inherent biometric information to access the vehicle 104. On the other hand, if the biometric comparator module 116 considers the inputs not to match and authentication fails, the door 138 is not opened.

In various embodiments, a second type of biometric matching can be used to attempt to identify the user 108, as a failback mechanism. For example, if the first biometric input used includes photographs, a backup biometric input could include an iris scan. Thus, the vehicle controller 122 could activate an iris scanner on the vehicle 104 (if present) in order to provide a secondary means of verifying the identity of the user 108.

According to other embodiments, rather than using another type of biometric input, the vehicle controller 122 can include an access code module 140. The access code module 140 can also be associated with the service provider 102 in some embodiments. An access code can be generated by the access code module 140 can generate a unique or random access code at the time a ride request is received. The user 108 can enter the access code on an interface 142 of the vehicle 104 (such as a physical or virtual keypad). If the codes match, the access control module 132 of the vehicle controller 122 can activate the door actuator 136 to open the door 138 of the vehicle 104. In some embodiments, the access code is generated and provided to the user 108 when a ride share request is received. In another embodiment, the access code can be generated dynamically when a failure to authenticate the user 108 occurs.

According to some embodiments, the aforementioned biometric access processes can be augmented to enhance security. For example, rather than storing the first biometric input (e.g., a full resolution biometric input) in complete form, the security module 118 can generate a secure representation of the biometric input. Using the example above where photographs are obtained of the user 108, these images can be secured by the security module 118 applying a one-way algorithm that converts the images to an unrecognizable form from which the original images cannot be recovered. This is generally referred to as de-identifying the first biometric data.

Stated otherwise, the algorithm can include any algorithm that converts the first biometric input into an unrecognizable form that maintains a correlation to the original image so that similarity comparisons can still be performed by the biometric comparator module 116 of the service provider 102. According to some embodiments, the algorithm provides a one-way conversion of biometric data into a secure or unrecognizable form such that the original biometric data cannot be recovered therefrom.

An example of such an algorithm is a Bloom filter. Once the reference image (or other biometric identifier), such as the first biometric input, is converted to an unrecognizable form, it is stored by the service provider 102. These converted versions of biometric input are referred to generally as biometric representations of biometric input. The biometric representations are associated with a unique identifier for the user 108. In some embodiments, the data stored in the user account may not include any specific personally identifiable information (PII). For example, names, addresses, age, or other identifying information is not stored in the same data store as the biometric representations. Should any such information be required for other purposes (such as billing information), it can be stored at a different location with a reference to the unique identifier for the user 108.

In some embodiments, in addition to securing the first biometric input, the security module 118 can also convert the second biometric input into a second biometric representation. Again, both the first and second biometric representations include de-identified data. While the comparison between the first and second biometric inputs by the biometric comparator module 116 of the service provider 102 generates a percentage confidence score, a comparison between the first and second biometric representations by the biometric comparator module 116 of the service provider 102 also generates a percentage confidence score. Access to the vehicle 104 can be controlled based on this comparison. It will be understood that while the biometric comparator module 116 is disclosed as being associated with the service provider 102, the biometric comparator module 116 can also likewise be associated with the vehicle controller 122.

Additionally, a matching algorithm utilized by the biometric comparator module 116 that processes the biometric representations can implement a randomization parameter similar to a salt or nonce value, also generally referred to as entropy bits. This randomization parameter can ensure that even if the secured biometric data (e.g., biometric representation(s)) is compromised and the matching algorithm that is used to secure the biometric data is known, matching data could not be generated unless the salt or nonce (entropy bits) is also known.

In one example use case, pursuant to a ride share request, the vehicle 104 requests the unique identifier for the user 108 that is expected for that vehicle 104 at that particular day and time. The biometric comparator module 116 determines if the biometric data captured from the sensors attached to the vehicle (second biometric representation generated from the second biometric input) matches the biometric data associated with the unique identifier (the first biometric representation generated from the first biometric input). This matching software may reside on the vehicle 104, or be hosted on the cloud. As noted above, the biometric comparator module 116 returns a confidence score based on the comparison. Based on whether there is a match between the first and second biometric representations, the vehicle controller 122 will perform some action that indicates whether the user was authenticated or not. Some examples of this action may include operating a servo to open a vehicle door or indicating to the user that the user is now able to access the vehicle through the door. In the event that the confidence score is not sufficient to authenticate the user, the user will be prompted to enter an access code (described above) into a physical or virtual keypad on the vehicle. Access to the vehicle may only be granted if the access code entered by the user matches that provided earlier to the user.

Illustrative Methods and Operations

Figure 2:
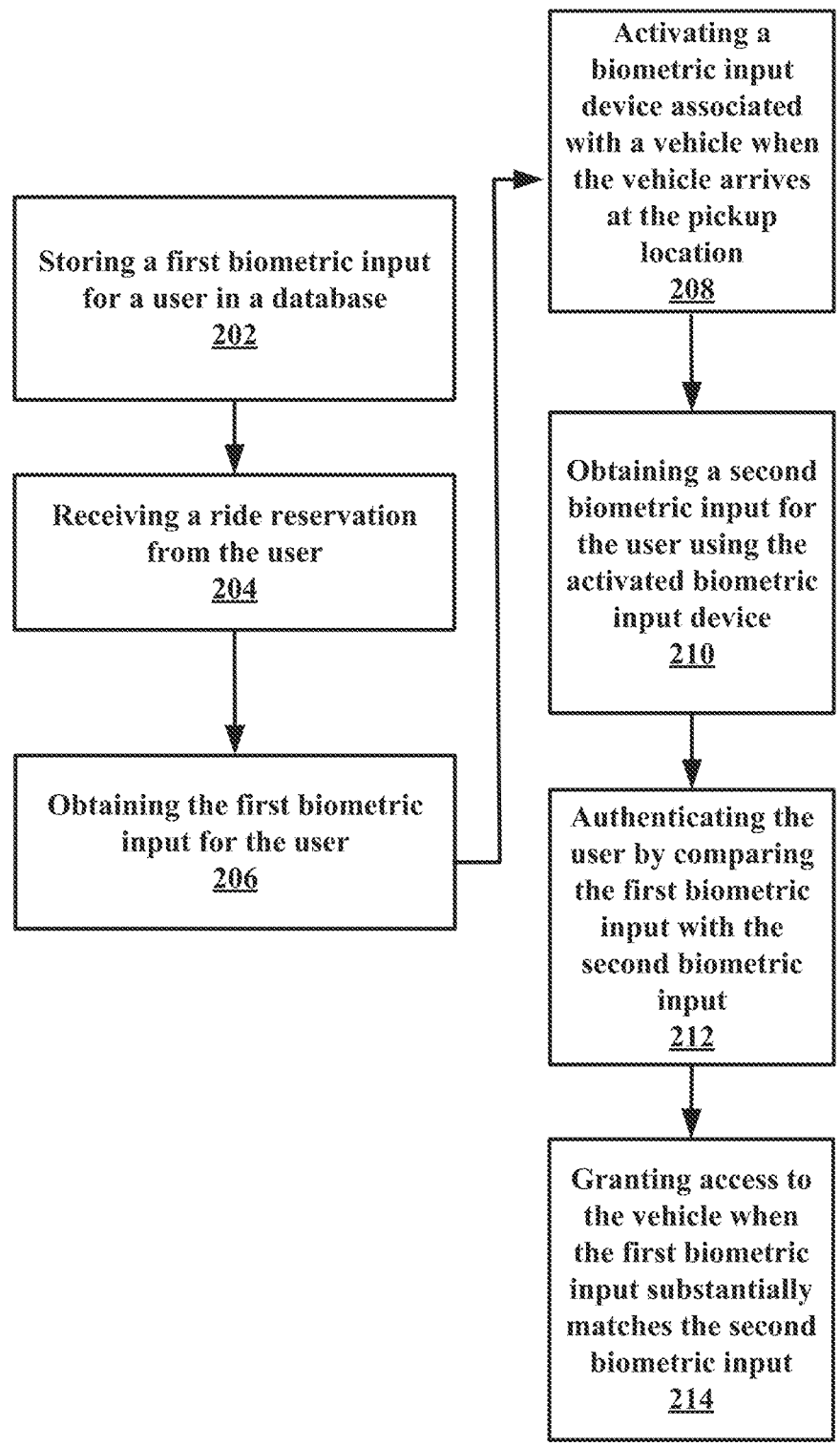
FIG. 2 is a flowchart of a method of the present disclosure that is generally directed to mediating access to a vehicle through the use of biometric information or input.

The following descriptions provide additional details on the function and methodological aspects of the present disclosure provided through the architectures and/or systems disclosed above. For example, FIG. 2 is a flowchart of a method of the present disclosure that is generally directed to mediating access to a vehicle through the use of biometric information or input. In some embodiments, the method includes a step 202 of storing a first biometric input for a user in a database. As noted above, this step can occur when a user creates a user account. The first biometric input can include any one or more biometric inputs disclosed above such as a fingerprint, an iris scan, one or more photographs, voice recordings, and so forth.

In various embodiments, the method includes a step 204 of receiving a ride reservation from the user. In some instances, the ride hailing request comprises at least a pickup location for the user and a unique identifier for the user. In one or more embodiments, the method includes a step 206 of obtaining the first biometric input for the user. The first biometric input can be obtained using the unique identifier for the user. The first biometric input can be retrieved from an service provider or other data store.

The method can also include a step 208 of activating a biometric input device associated with a vehicle when the vehicle arrives at the pickup location. As noted above, the biometric input device can include any biometric input device or sensor that is capable of obtaining a second biometric input that corresponds in type to the first biometric input. Thus, if the first biometric input comprises an iris scan, the biometric input device activated on the vehicle includes an iris scanner. The method thus includes a step 210 of obtaining a second biometric input for the user using the activated biometric input device.

According to some embodiments, the method includes a step 212 of authenticating the user by comparing the first biometric input with the second biometric input, as well as a step 214 of granting access to the vehicle when the first biometric input substantially matches the second biometric input.

Figure 3:
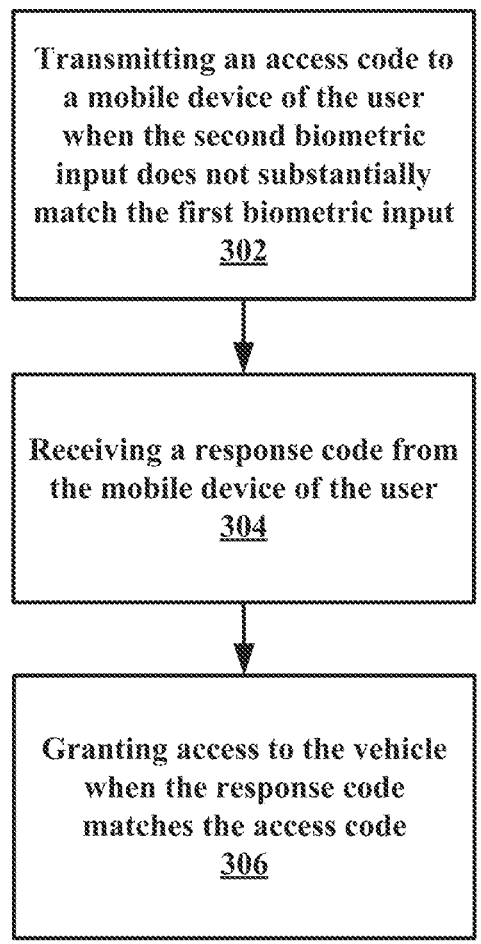
FIG. 3 is a flowchart of an example method of the present disclosure that involves the use of an access code and response code authentication process.

FIG. 3 is a flowchart of a method that can be performed if the authentication step 212 of FIG. 2 fails. The method of FIG. 3 is directed to a backup or secondary authentication method that utilizes an access code exchange. The method includes a step 302 of transmitting an access code to a mobile device of the user when the second biometric input does not substantially match the first biometric input. Next, the method includes a step 304 of receiving a response code from the mobile device of the user. As noted throughout, this can include the user entering the response code into a physical or virtual interface of the vehicle, such as a keypad. Next, the method includes a step 306 of granting access to the vehicle when the response code matches the access code. Otherwise, if a match is not found between the response code and the access code, access to the vehicle is denied. In some embodiments, the access code is generated after receiving the ride reservation from the user.

Figure 4:
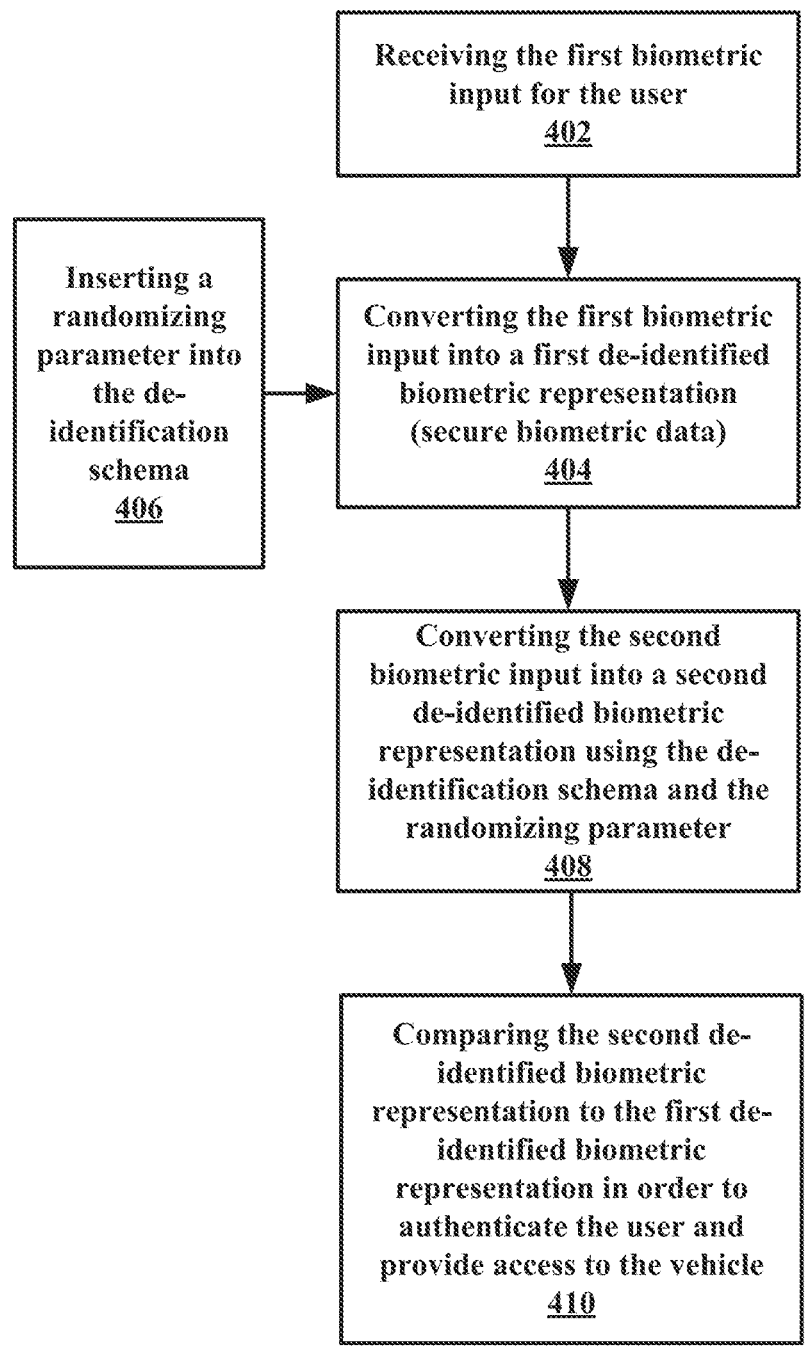
FIG. 4 is a flowchart of another example method of the present disclosure for securing biometric data through de-identification.

FIG. 4 is a flowchart of an example method for de-identifying biometric input and using the same for authenticating a user. The method can include a step 402 of receiving the first biometric input for the user and a step 404 of converting the first biometric input into a first de-identified biometric representation. In some embodiments, the first de-identified biometric representation is created using a de-identification schema. As noted above, this de-identification schema could include a filter, such as a Bloom filter that converts the biometric inputs into an unrecognizable form that can still be used to perform comparisons.

To further secure the de-identification process, the method can include an optional step 406 of inserting a randomizing parameter into the de-identification schema. As noted above, this can include inserting bits of entropy generated by a randomizing function that is seeded with a value.

The method can also include a step 408 of converting the second biometric input into a second de-identified biometric representation using the de-identification schema and the randomizing parameter. Again, this second biometric input is obtained by a sensor/input device associated with a vehicle. In some embodiments, the method includes a step 410 of comparing the second de-identified biometric representation to the first de-identified biometric representation in order to authenticate the user and provide access to the vehicle.

Figure 5:
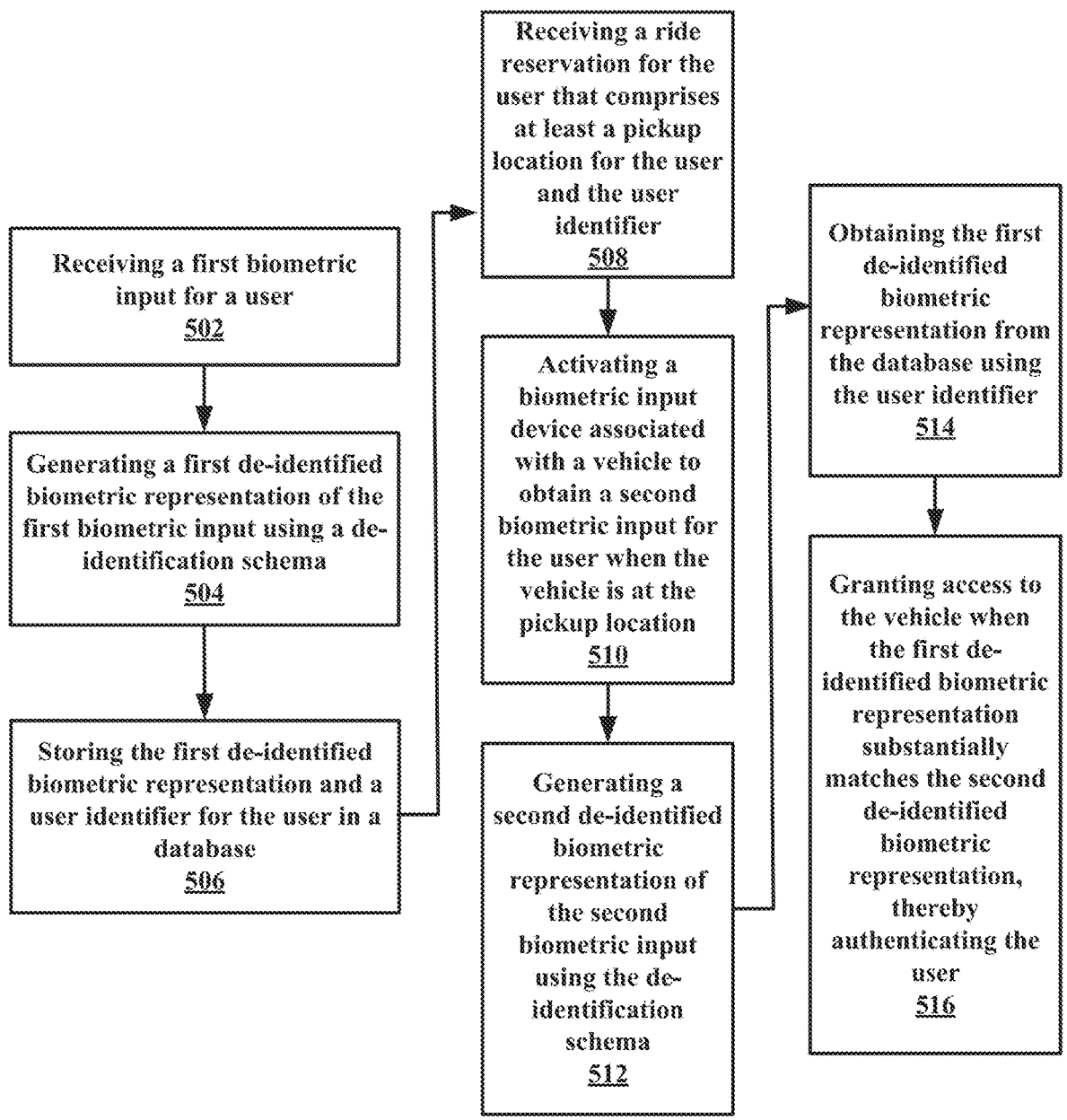
FIG. 5 is a flowchart of yet another example method of the present disclosure.

FIG. 5 is a flowchart of an example method of the present disclosure that can be executed by a vehicle configured in accordance with the present disclosure. The method includes a step 502 of receiving a first biometric input for a user. Next, the method includes a step 504 of generating a first de-identified biometric representation of the first biometric input using a de-identification schema. According to some embodiments, the method includes a step 506 of storing the first de-identified biometric representation and a user identifier for the user in a database. This process is generally indicative of a user registration process.

In various embodiments, the method includes a step 508 of receiving a ride reservation for the user that comprises at least a pickup location for the user and the user identifier. Next, the method includes a step 510 of activating a biometric input device associated with a vehicle to obtain a second biometric input for the user when the vehicle is at the pickup location. The method also includes a step 512 of generating a second de-identified biometric representation of the second biometric input using the de-identification schema.

According to some embodiments, the method also includes a step 514 of obtaining the first de-identified biometric representation from the database using the user identifier, as well as a step 516 of granting access to the vehicle when the first de-identified biometric representation substantially matches the second de-identified biometric representation, thereby authenticating the user.

According to some embodiments, the method can include using an access and response code process when authentication of the user using biometrics fails. The method can include generating an access code that is transmitted to a mobile device of the user when the ride reservation is received, as well as granting access to the vehicle when a response code received from the mobile device is received, when the user cannot be authenticated using the first de-identified biometric representation and the second de-identified biometric representation.

EXAMPLE EMBODIMENTS

In some instances, the following examples may be implemented together or separately by the systems and methods described herein.

Example 1 may include a method, comprising: storing a first biometric input for a user in a database; receiving a ride reservation from the user, the ride reservation comprising at least a pickup location; activating a biometric input device associated with a vehicle when the vehicle arrives at the pickup location to obtain a second biometric input for the user; authenticating the user by comparing the first biometric input with the second biometric input; and granting access to the vehicle when the first biometric input substantially matches the second biometric input.

Example 2 may include the method according to example 1, further comprising: transmitting an access code to a mobile device of the user when the second biometric input does not substantially match the first biometric input; receiving a response code from the mobile device of the user; and granting access to the vehicle when the response code matches the access code.

Example 3 may include the method according to example 2 and/or some other example herein, further comprising generating the access code after receiving the ride reservation from the user.

Example 4 may include the method according to example 1 and/or some other example herein, further comprising: receiving the first biometric input for the user; and converting the first biometric input into a first de-identified biometric representation, wherein the first de-identified biometric representation is created using a de-identification schema.

Example 5 may include the method according to example 4 and/or some other example herein, further comprising inserting a randomizing parameter into the de-identification schema.

Example 6 may include the method according to example 5 and/or some other example herein, wherein authenticating the user by comparing the first biometric representation to the second biometric input further comprises: converting the second biometric input into a second de-identified biometric representation using the de-identification schema and the randomizing parameter; and comparing the second de-identified biometric representation to the first de-identified biometric representation.

Example 7 may include the method according to example 6 and/or some other example herein, further comprising transmitting the first de-identified biometric representation to the vehicle when the vehicle has been matched to the user based on the ride reservation, the ride reservation comprising any of the pickup location, a date, and a time.

Example 8 may include the method according to example 7 and/or some other example herein, further comprising transmitting an access code to a mobile device of the user after the vehicle has been matched to the user.

Example 9 may include the method according to example 1 and/or some other example herein, wherein granting access to the vehicle further comprises any of operating a servo to open a vehicle door, indicating that the user can access the vehicle through the vehicle door, or a combination thereof.

Example 10 may include a method, comprising: receiving a first biometric input for a user; generating a first de-identified biometric representation of the first biometric input using a de-identification schema; storing the first de-identified biometric representation and a user identifier for the user in a database; receiving a ride reservation for the user that comprises at least a pickup location for the user and the user identifier; activating a biometric input device associated with a vehicle to obtain a second biometric input for the user when the vehicle is at the pickup location; generating a second de-identified biometric representation of the second biometric input using the de-identification schema; obtaining the first de-identified biometric representation from the database using the user identifier; and granting access to the vehicle when the first de-identified biometric representation substantially matches the second de-identified biometric representation, thereby authenticating the user.

Example 11 may include the method according to example 10, further comprising applying a randomizing parameter when generating the first de-identified biometric representation and when generating the second de-identified biometric representation.

Example 12 may include the method according to example 10 and/or some other example herein, further comprising: generating an access code that is transmitted to a mobile device of the user when the ride reservation is received; and granting access to the vehicle when a response code is received from the mobile device, when the user cannot be authenticated using the first de-identified biometric representation and the second de-identified biometric representation.

Example 13 may include the method according to example 10 and/or some other example herein, wherein when the ride reservation comprises user identifiers for a plurality of users at the pickup location, the method is performed for each of the plurality of users in a randomized manner.

Example 14 may include a system, comprising: at least one processor and memory, the processor executing instructions stored in the memory to: generate a first de-identified biometric representation of a first biometric input of a user using a de-identification schema; transmit a ride reservation to a vehicle that includes the user identifier and a pickup location; receive a second biometric input for the user from the vehicle; generate a second de-identified biometric representation of the second biometric input using the de-identification schema; authenticate the user using the first de-identified biometric representation and the second de-identified biometric representation; and transmit a command to the vehicle to unlock a vehicle door or open the vehicle door when the first de-identified biometric representation substantially matches the second de-identified biometric representation.

Example 15 may include the system according to example 14, wherein the processor is further configured to insert a randomizing parameter into the de-identification schema.

Example 16 may include the system according to example 15 and/or some other example herein, wherein the processor is further configured to: generate an access code that is transmitted to a mobile device of the user when the ride reservation is received; and transmit a command to the vehicle when a response code received from the mobile device matches the access code.

Example 17 may include the system according to example 16 and/or some other example herein, wherein the vehicle is configured to operate a servo to open a vehicle door, indicate that the user can access the vehicle through the vehicle door, or a combination thereof.

Example 18 may include the system according to example 17 and/or some other example herein, wherein when the ride reservation comprises user identifiers for a plurality of users at the pickup location, the processor authenticates each of the plurality of users in a randomized manner.

Example 19 may include the system according to example 18 and/or some other example herein, wherein the processor is further configured to store the first de-identified biometric representation and a user identifier for the user in a database.

Example 20 may include the system according to example 18 and/or some other example herein, wherein the ride reservation comprises any of the pickup location, a date, and a time.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method, comprising:
   receiving a first biometric input for a user;
   converting the first biometric input into a first de-identified biometric representation, wherein the first de-identified biometric representation is created using a de-identification schema;
   inserting a randomizing parameter into the de-identification schema;
   storing the first biometric input for the user in a database;
   receiving a ride reservation from the user, the ride reservation comprising at least a pickup location;
   activating a biometric input device associated with a vehicle when the vehicle arrives at the pickup location to obtain a second biometric input for the user;
   authenticating the user by comparing the first biometric input with the second biometric input by
      converting the second biometric input into a second de-identified biometric representation using the de-identification schema and the randomizing parameter, and
      comparing the second de-identified biometric representation to the first de-identified biometric representation; and
   granting access to the vehicle when the first biometric input substantially matches the second biometric input.

2. The method according to claim 1, further comprising:
   transmitting an access code to a mobile device of the user when the second biometric input does not substantially match the first biometric input;
   receiving a response code from the mobile device of the user; and
   granting access to the vehicle when the response code matches the access code.

3. The method according to claim 2, further comprising generating the access code after receiving the ride reservation from the user.

4. The method according to claim 1, further comprising transmitting the first de-identified biometric representation to the vehicle when the vehicle has been matched to the user based on the ride reservation, the ride reservation comprising any of the pickup location, a date, and a time.

5. The method according to claim 4, further comprising transmitting an access code to a mobile device of the user after the vehicle has been matched to the user.

6. The method according to claim 1, wherein granting access to the vehicle further comprises any of operating a servo to open a vehicle door, indicating that the user can access the vehicle through the vehicle door, or a combination thereof.

7. A method, comprising:
   receiving a first biometric input for a user;
   generating a first de-identified biometric representation of the first biometric input using a de-identification schema;
   storing the first de-identified biometric representation and a user identifier for the user in a database;
   receiving a ride reservation for the user that comprises at least a pickup location for the user and the user identifier;
   activating a biometric input device associated with a vehicle to obtain a second biometric input for the user when the vehicle is at the pickup location;

generating a second de-identified biometric representation of the second biometric input using the de-identification schema;

obtaining the first de-identified biometric representation from the database using the user identifier; and granting access to the vehicle when the first de-identified biometric representation substantially matches the second de-identified biometric representation, thereby authenticating the user.

8. The method according to claim 7, further comprising applying a randomizing parameter when generating the first de-identified biometric representation and when generating the second de-identified biometric representation.

9. The method according to claim 7, further comprising:
generating an access code that is transmitted to a mobile device of the user when the ride reservation is received; and granting access to the vehicle when a response code is received from the mobile device, when the user cannot be authenticated using the first de-identified biometric representation and the second de-identified biometric representation.

10. The method according to claim 7, wherein when the ride reservation comprises user identifiers for a plurality of users at the pickup location, the method is performed for each of the plurality of users in a randomized manner.

11. A system, comprising:
at least one processor and memory, the processor executing instructions stored in the memory to:
generate a first de-identified biometric representation of a first biometric input of a user using a de-identification schema;
transmit a ride reservation to a vehicle that includes the user identifier and a pickup location;
receive a second biometric input for the user from the vehicle;
generate a second de-identified biometric representation of the second biometric input using the de-identification schema;
authenticate the user using the first de-identified biometric representation and the second de-identified biometric representation; and
transmit a command to the vehicle to unlock a vehicle door or open the vehicle door when the first de-identified biometric representation substantially matches the second de-identified biometric representation.

12. The system according to claim 11, wherein the processor is further configured to insert a randomizing parameter into the de-identification schema.

13. The system according to claim 12, wherein the processor is further configured to:
generate an access code that is transmitted to a mobile device of the user when the ride reservation is received; and
transmit a command to the vehicle when a response code received from the mobile device matches the access code.

14. The system according to claim 13, wherein the vehicle is configured to operate a servo to open a vehicle door, indicate that the user can access the vehicle through the vehicle door, or a combination thereof.

15. The system according to claim 14, wherein when the ride reservation comprises user identifiers for a plurality of users at the pickup location, the processor authenticates each of the plurality of users in a randomized manner.

16. The system according to claim 15, wherein the processor is further configured to store the first de-identified biometric representation and a user identifier for the user in a database.

17. The system according to claim 15, wherein the ride reservation comprises any of the pickup location, a date, and a time.

* * * * *